April 16, 1935. J. F. NICOLETTE 1,997,872
BAKING UTENSIL
Filed Nov. 28, 1933
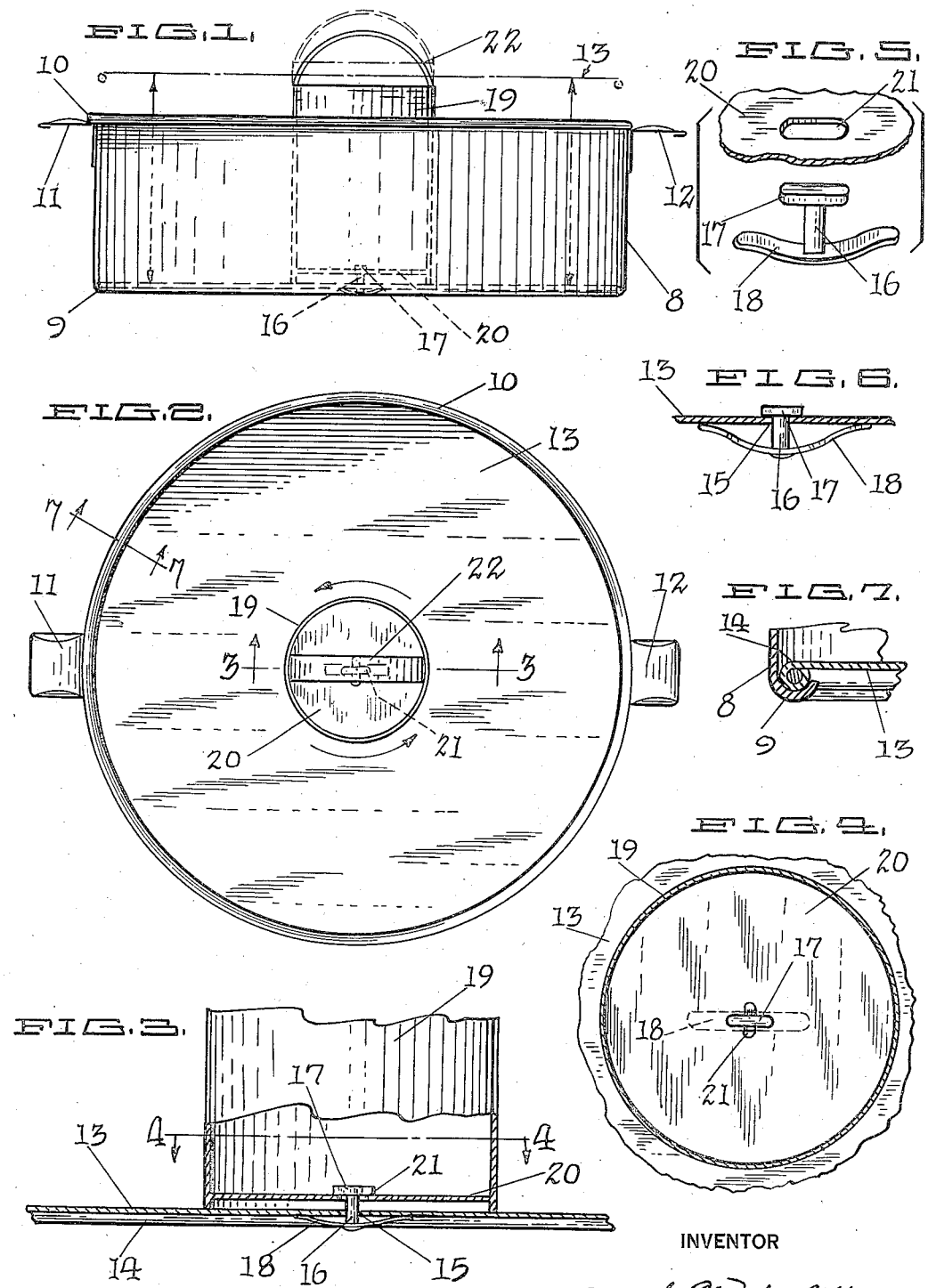
INVENTOR
Joseph F. Nicolette Patented Apr. 16, 1935

1,997,872

UNITED STATES PATENT OFFICE 1,997,872

BAKING UTENSIL

Joseph F. Nicolette, San Francisco, Calif.

Application November 28, 1933, Serial No. 700,069

4 Claims. (Cl. 53—6)

The present invention relates generally to culinary utensils and has particular reference to utensils or baking pans for baking angel food cake and the like.

The primary object of the invention is to provide a sectional baking tin or pan of the class indicated, in which the bottom and central core section thereof are removable from the circular wall section thereof in order to facilitate the removal of the baked cake from the tin or pan without damaging the exterior or bottom of said cake.

A further object of the invention is the provision of a cake tin in which the various sectional parts thereof may be quickly and easily assembled and disassembled.

A still further object of the invention is to provide a simple and efficient sectional pan of the class set forth that may be easily cleansed after the baked cake has been removed therefrom.

Additional to the foregoing objects is that of providing a sectional culinary pan embodying a removable central core section and novel means for retaining said section in place upon the removable bottom section thereof.

Other objects and advantages of the invention will become apparent with reference to the subjoined specification and the accompanying drawing in which:—

Figure 1 is a side elevation of the baking utensil showing the removable central core section in place, the dot-and-dash lines above the figure indicating the removability of the bottom and central core section from the remainder of the utensil;

Figure 2 is a plan view of the same showing the removable bottom and centrally disposed core section in place thereon;

Figure 3 is an enlarged fragmentary sectional detail of a portion of the removable bottom and section and illustrating the means for detachably retaining the core section upon said bottom, the section being indicated by the line 3—3 in Figure 2;

Figure 4 is a horizontal plan section taken on the line 4—4 of Figure 3 and further illustrating the core retaining means;

Figure 5 is a perspective detail illustrating a fragmentary section of the core bottom, slot, and the spring retaining member adapted to enter said slot to retain the core in place upon the removable bottom;

Figure 6 is a sectional detail illustrating the spring retaining member in retracted position as it appears after the core has been detached therefrom;

Figure 7 is an enlarged sectional detail of the enrolled bottom edge of the utensil wall showing the removable bottom resting thereon, the section being taken on the line 7—7 in Figure 2.

I am aware of the fact that pie tins and the like with removable bottoms are at present available and I am also aware of the fact that special tins having a central core section are also available for baking angel food cake, however, the latter consist of a single piece of metal, and do not have a removable bottom in combination with a removable core as in the utensil of my invention.

The removable bottom and core greatly facilitate the removal of the baked cake from the utensil in that the bottom and core are first lifted out of the utensil, and then the core is removed from the bottom after which the cake may be readily released from the bottom by inserting a knife under the cake thereby gently removing the same without in any way damaging the exterior or underside thereof.

In detail the utensil comprises, a circular wall section 8 having an enrolled lower bead 9 and a beaded upper edge 10, and provided with handles 11 and 12, all clearly disclosed in Figures 1 and 7.

The removable bottom 13 consists of a circular disc having a beaded edge 14, Figure 7, adapted to rest in the inturned bead 9 of the utensil wall 8. Centrally arranged in this bottom is a square opening 15 through which extends a rivet 16, said rivet having a square shank and an elongated head 17 formed at its upper end and provided at its lower end with a bowed flat spring 18, said spring normally resting against the removable bottom 13 of the utensil.

The core 19 consists of a cylinder having a bottom 20 slightly raised from the lower edge of said cylinder, as shown in Figure 3, and the bottom 20 is provided with a centrally disposed slot 21 adapted to register with and receive the bead 17 of the rivet 16 and the upper open edge is provided with a bail 22.

In assembling the utensil for use the cylinder or core 19 is centered on the removable bottom 13 with the slot 21 thereof in register with the head 17 of the rivet. It is then forced downwardly by means of the handle 22 until the rivet head 17 extends through the slot 21, by virtue of the fact that the removable bottom 13 gives slightly, thus forcing the rivet head into its slot, after which the cylinder is given a quarter turn in either direction, as shown by the arrows in Figure 2. The spring the while being placed under tension holds the cylinder and utensil bottom 13 in fixed relation.

In removing the core 19 the same is merely turned in a like manner until the rivet head again registers with the slot 21 after which the parts are readily separated by the spring 18 snapping the rivet 16 to the position shown in Figure 6.

When affixing or removing the core 19 from the bottom 13, the square shank of the rivet 16 mounted in the square opening 15 prevents the elongated head 17 from rotating, and thus makes positive and quick operation of the coupling or uncoupling of the core 19.

I claim and desire to secure by Letters Patent of the United States the following:—

1. A baking utensil of the class described comprising a circular wall section having an opening formed in its bottom, a curl arranged at the lower edge thereof, a beaded removable bottom resting upon said curl, said bottom having a core arranged centrally thereon, and a resilient element connecting said core to said bottom whereby said core may be detached from the bottom.

2. A baking utensil of the class described, embodying a circular open wall section having an inturned curl formed at its lower edge, a beaded bottom section adapted to rest in said curl, said bottom having a centrally disposed core arranged thereon, and means for detachably securing said core thereon comprising a spring pressed element adapted to cause the separation of said bottom and said core at will by the operator.

3. In a baking utensil of the class described, a circular open wall section having a removable bottom arranged therein, a cylindrical core arranged on said bottom, a bottom arranged in said core, a slot formed in the core bottom, and a spring pressed rivet arranged in the pan bottom and adapted to register and non-register with said slot when said core is turned relative to said pan bottom.

4. In a baking utensil of the class described, a wall section and a removable bottom therefor, a cylindrical core arranged on said bottom and itself having a bottom section, said core bottom having a slot arranged therein, a retaining rivet extending through the pan bottom and adapted to register with said slot and when turned relative to the slot adapted to fasten the core to said pan bottom, and a flat retaining spring arranged on said rivet and adapted to hold the core and pan bottom in fixed relation.

JOSEPH F. NICOLETTE.